(No Model.) 7 Sheets—Sheet 1.

E. REYNOLDS, A. J. SHAW & W. H. TROUT.
SAW MILL SET WORKS.

No. 448,544. Patented Mar. 17, 1891.

Attest:
Sidney P. Hollingsworth
Horace A. Dodge.

Inventors:
EDWIN REYNOLDS
ALTON J. SHAW
W. H. TROUT
by their attorneys
Dodge Sons.

THE NORRIS PETERS CO., PHOTO-LITHO., WASHINGTON, D. C.

(No Model.) 7 Sheets—Sheet 2.

E. REYNOLDS, A. J. SHAW & W. H. TROUT.
SAW MILL SET WORKS.

No. 448,544. Patented Mar. 17, 1891.

Attest:
Sidney P. Hollingsworth
Horace A. Dodge.

Inventors
EDWIN REYNOLDS
ALTON J. SHAW
W. H. TROUT
by their attorneys
Dodge & Sons.

(No Model.) 7 Sheets—Sheet 3.
E. REYNOLDS, A. J. SHAW & W. H. TROUT.
SAW MILL SET WORKS.

No. 448,544. Patented Mar. 17, 1891.

Attest,
Sidney P. Hollingsworth
Horace H. Dodge.

Inventors
EDWIN REYNOLDS
ALTON J. SHAW
W. H. TROUT
by their attorneys
Dodge & Sons.

(No Model.) 7 Sheets—Sheet 4.
E. REYNOLDS, A. J. SHAW & W. H. TROUT.
SAW MILL SET WORKS.

No. 448,544. Patented Mar. 17, 1891.

Attest.

Inventors
EDWIN REYNOLDS
ALTON J. SHAW
W. H. TROUT
by their attorneys
Dodge Sons

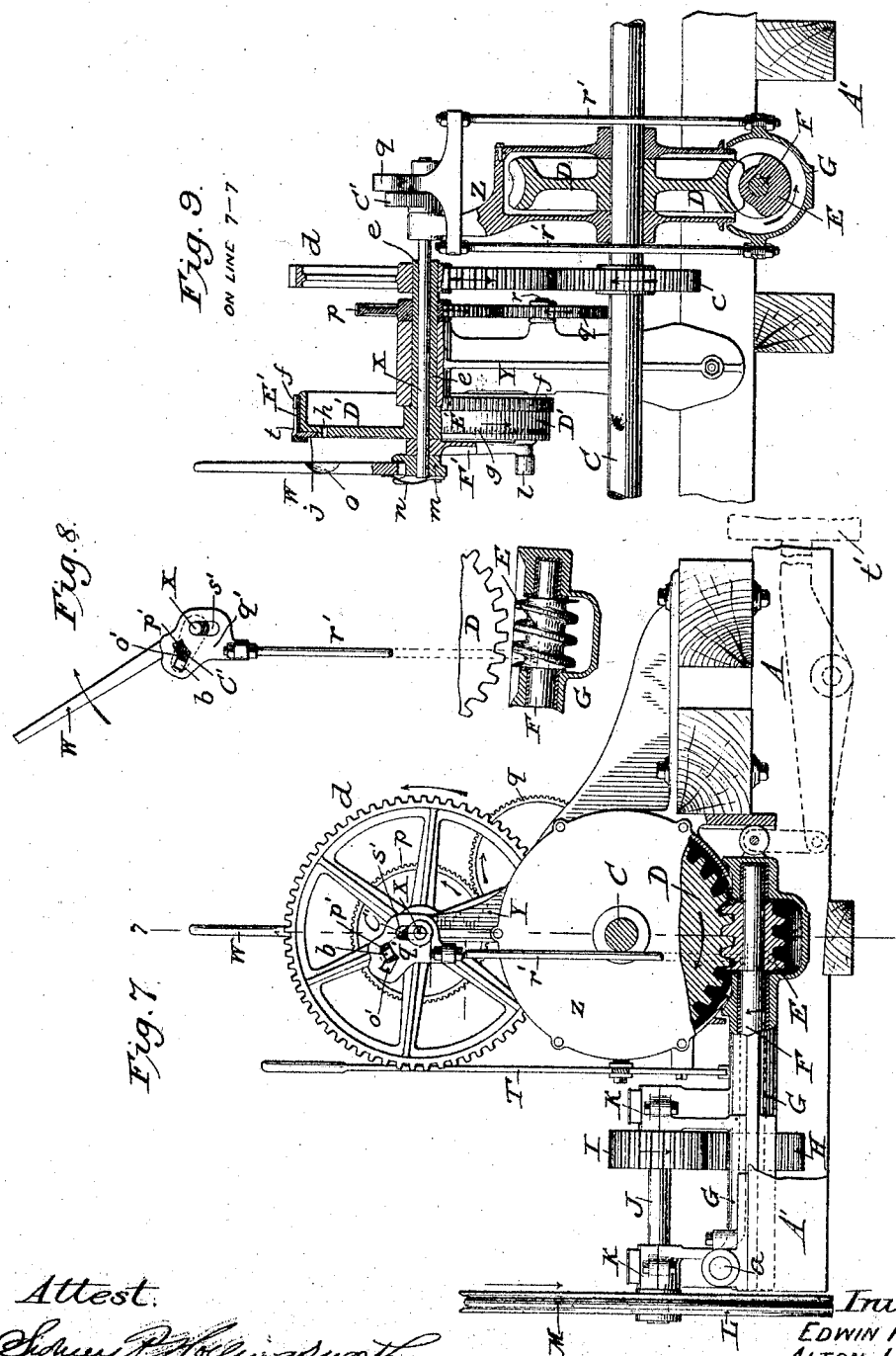

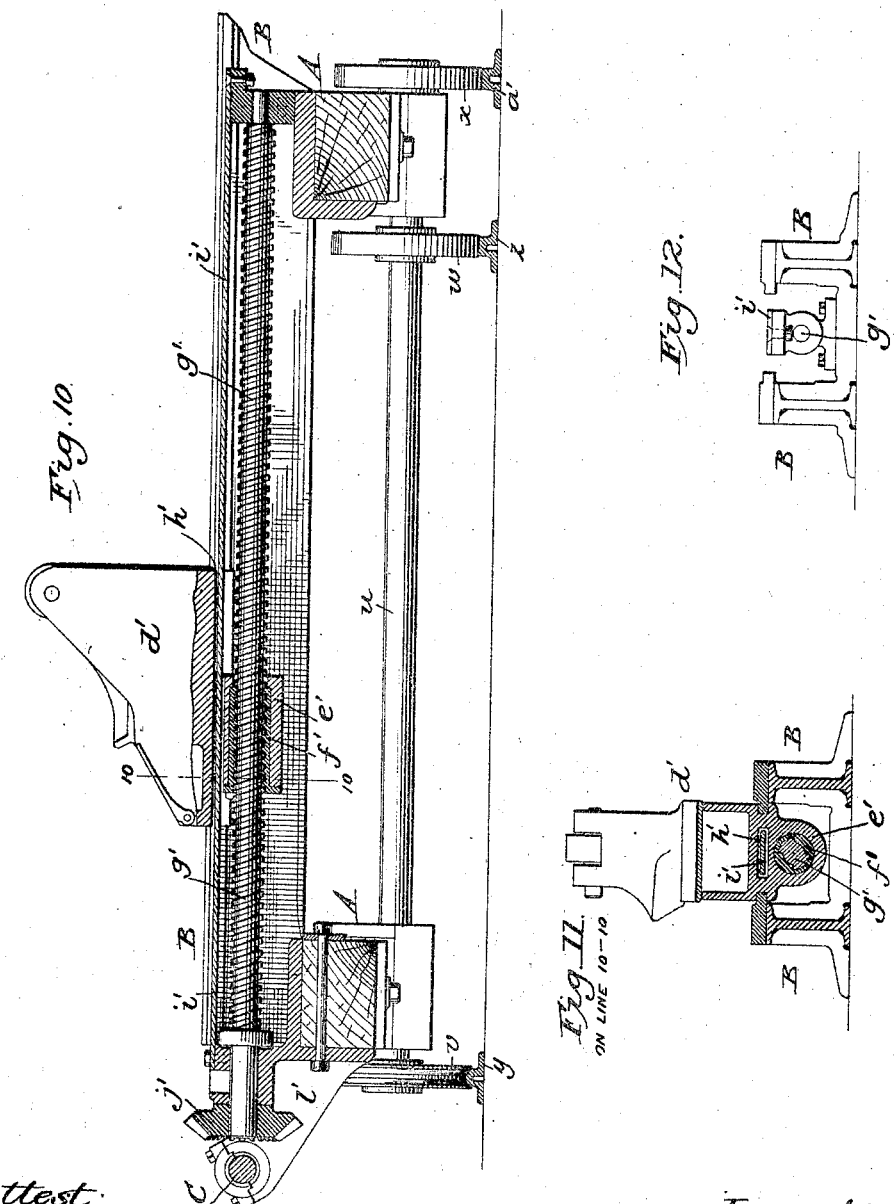

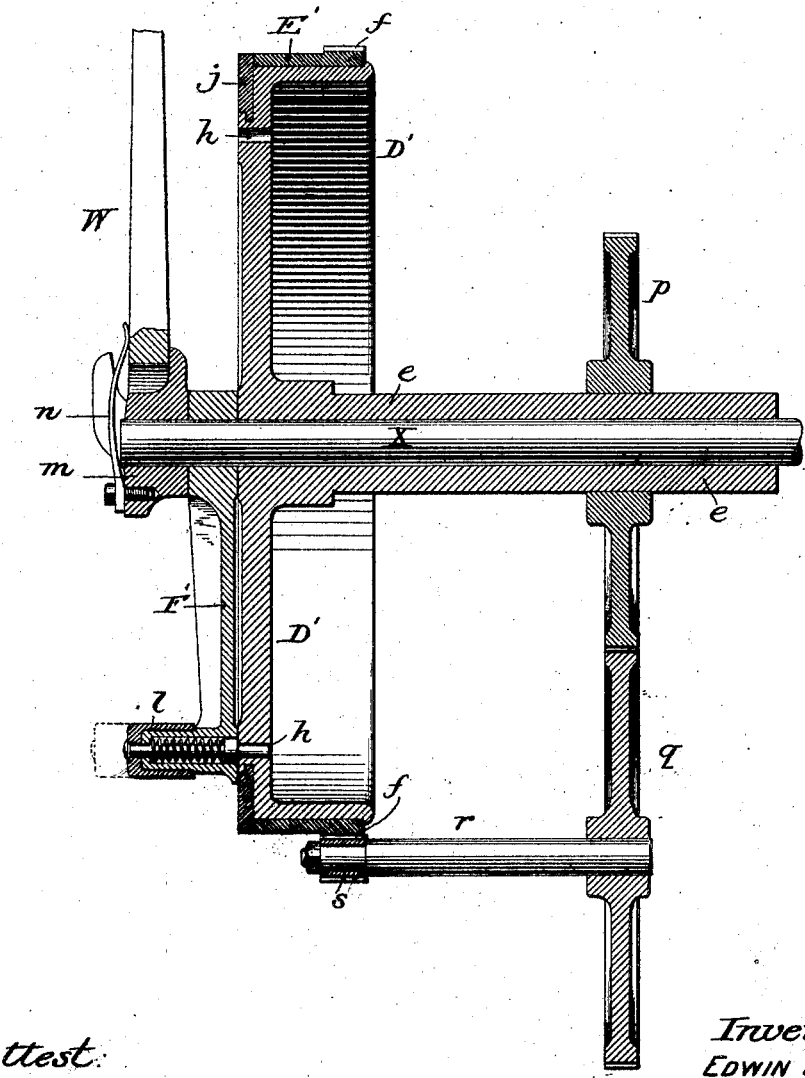

UNITED STATES PATENT OFFICE.

EDWIN REYNOLDS, ALTON J. SHAW, AND WILLIAM H. TROUT, OF MILWAUKEE, WISCONSIN, ASSIGNORS TO THE EDWARD P. ALLIS COMPANY, OF SAME PLACE.

SAW-MILL SET-WORKS.

SPECIFICATION forming part of Letters Patent No. 448,544, dated March 17, 1891.

Application filed August 15, 1890. Serial No. 362,097. (No model.)

*To all whom it may concern:*

Be it known that we, EDWIN REYNOLDS, ALTON J. SHAW, and WILLIAM H. TROUT, citizens of the United States, residing at Milwaukee, in the county of Milwaukee and State of Wisconsin, have invented certain new and useful Improvements in Saw-Mill Set-Works, of which the following is a specification.

Our invention relates to saw-mill set-works; and it consists in various features and details hereinafter set forth and claimed.

Figure 1:
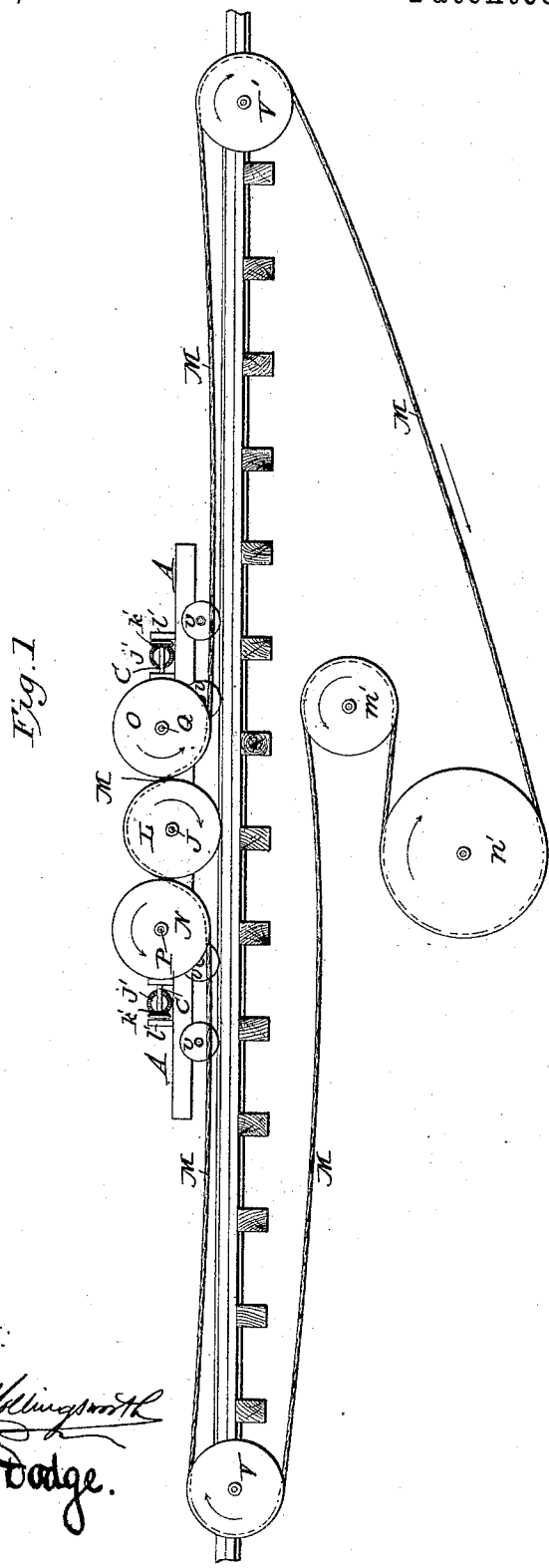
Figure 2:
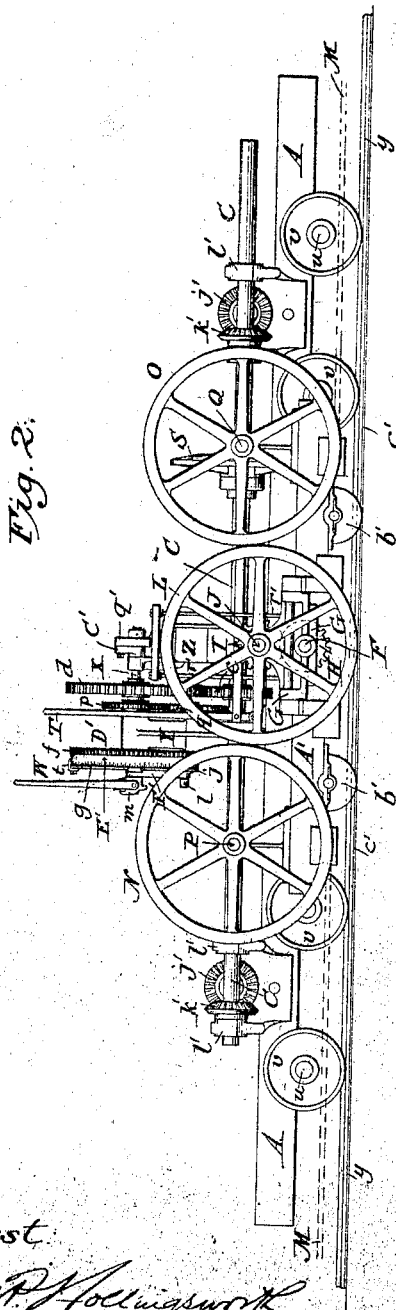
Figure 3:
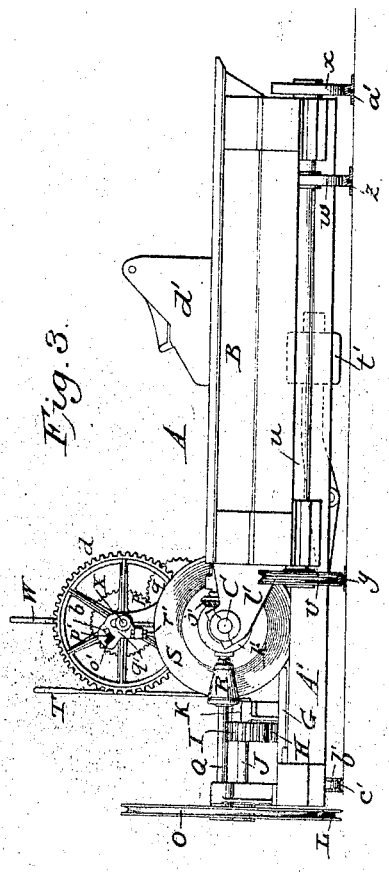
Figure 4:
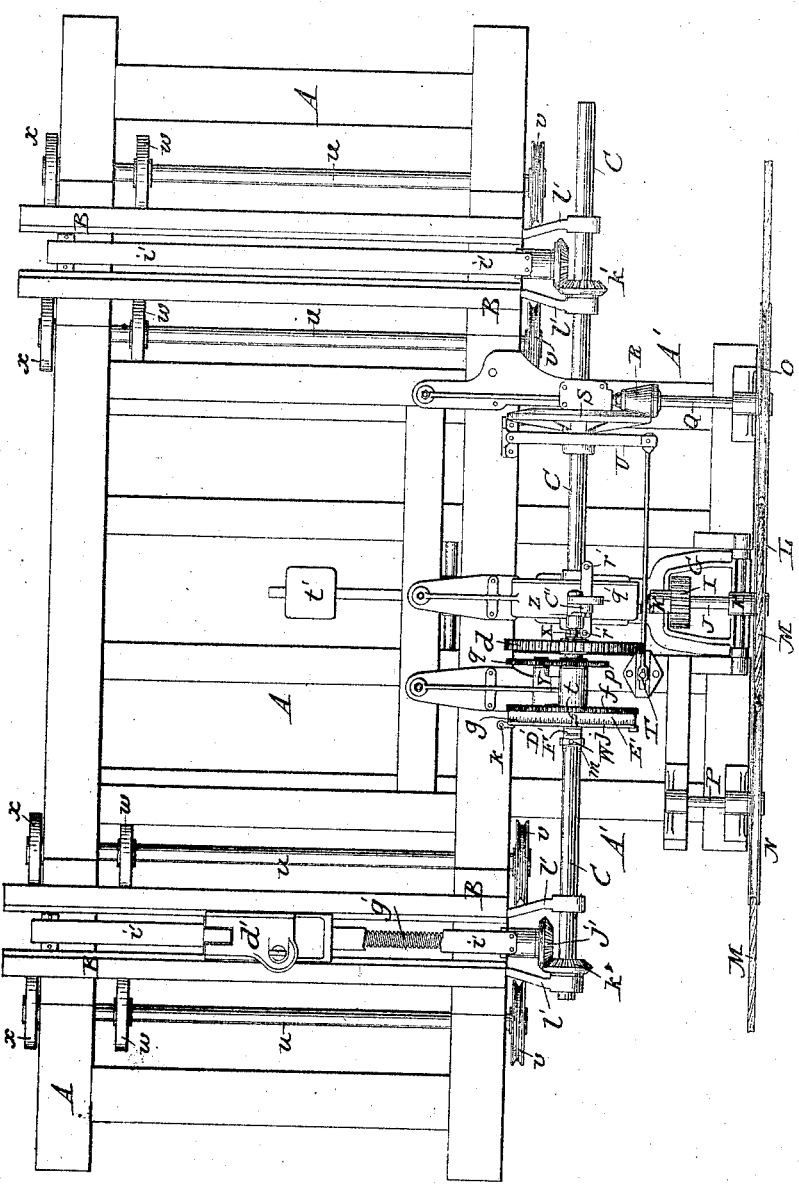
Figure 5:
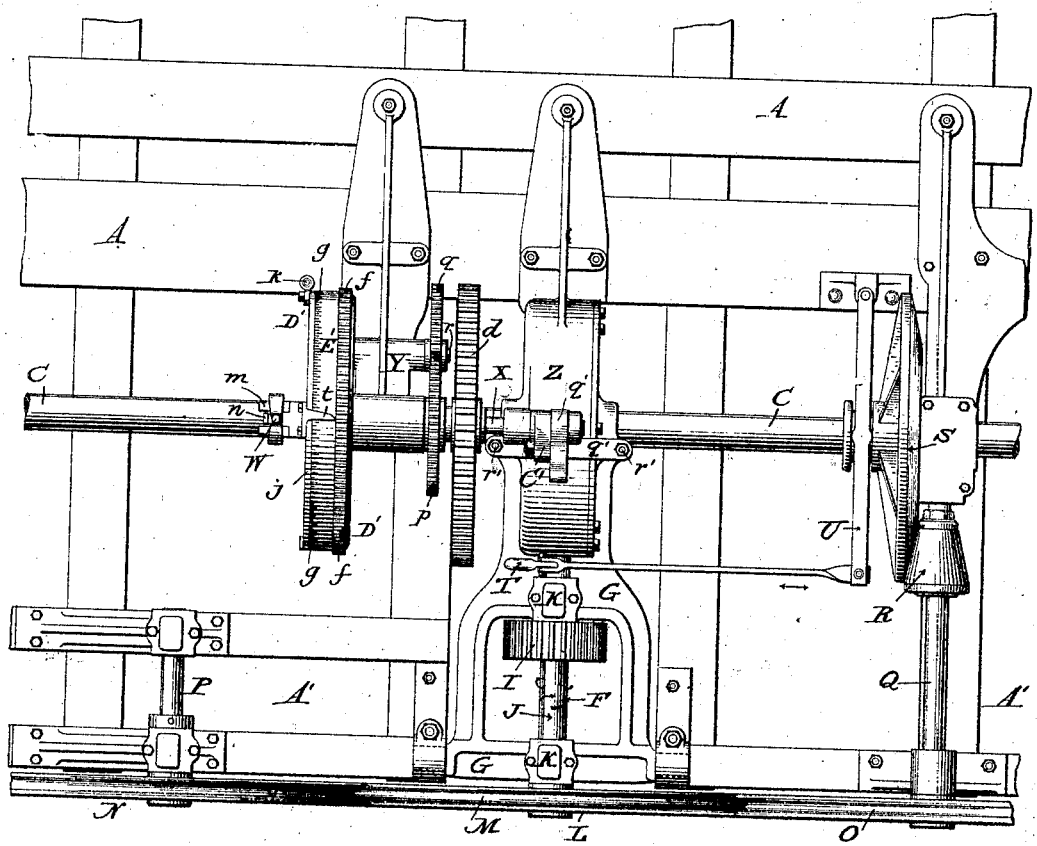
Figure 6:
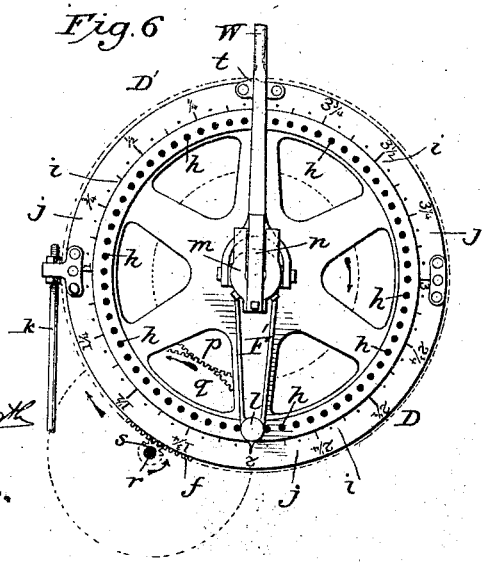

In the drawings, Figure 1 is a diagrammatic view showing the relative arrangement of the carriage and the cable for actuating the set-works; Fig. 2, a front face of the carriage; Fig. 3, a side or end view; Fig. 4, a top plan view; Fig. 5, a plan view of a part of the mechanism shown in Fig. 4, but on a larger scale; Fig. 6, a face view of the index-wheel; Figs. 7, 8, and 9, views illustrating the mechanism for imparting motion to the various devices upon the carriage, Fig. 9 being a sectional view on the line 7 7 of Fig. 7; Fig. 10, a longitudinal sectional view of the head-block; Fig. 11, a sectional view of the same on the line 10 10; Fig. 12, a rear end view, and Fig. 13 a sectional view of the indicating mechanism.

The carriage comprises a main portion A and an extension A', which latter projects from the front face of the main body, as in Figs. 2, 3, 4, and 5. The main body is supported by axles $u$ and wheels $v$, $w$, and $x$, designed to run, respectively, upon the tracks $y$, $z$, and $a'$, while the outer end of the extension A' of the carriage is supported by wheels $b'$, running upon a track $c'$, as clearly shown in Fig. 3.

Mounted upon the main frame of the carriage are the head-blocks B and knees $d'$, the head-block being slotted or made open along its upper edge, as shown in Figs. 4, 10, 11, and 12, to receive a lug $e'$, depending from the lower face of the knee. This lug is made hollow to receive an internally-threaded nut, sleeve, or collar $f'$, through which passes a screw $g'$, which is journaled at its ends in the head-block, as shown in Figs. 10, 11, and 12. It will be noticed upon reference to Figs. 10 and 11 that the depending lug $e'$ is further provided above the collar or nut $f'$ with a slot or opening $h'$, adapted to receive a narrow plate or guard $i'$, secured at opposite ends to the head-block at a distance above and parallel with the screw. The said plate, being of the same width or a little wider than the screw and extending the entire length of the threaded portion of the screw, forms a cover for the same and effectually prevents the sand, dirt, &c., carried up by the logs from falling upon the screw, and thereby interfering with its action and wearing it out. In Figs. 10 and 11 we have shown the lug as cast integral with the knee; but of course this is not essential, as it is obvious that the lug may be made separate from the knee and the thread formed in the lug instead of using a separate threaded sleeve or collar. At its outer end the screw-shaft $g'$ is provided with a bevel gear-wheel $j'$, which is designed to engage with a similar wheel $k'$ on the set-shaft C, which latter is journaled in suitable brackets or supports $l'$, projecting from the outer longitudinal timber of the main portion of the carriage, as shown in Figs. 2, 3, 4, and 10, so that when the set-shaft is rotated by means hereinafter described the knees will be moved forward or backward, according to the direction in which the shaft and also the screws are rotated.

Secured to the shaft C, preferably at a point between its ends, is a large worm-wheel D, which is designed to be engaged by a worm E, carried by a shaft F, which latter is journaled in a frame G, pivoted at its outer end, as at $a$, to the outer end of the extension A' of the carriage, as shown in Figs. 2, 4, 5, and 7. The shaft F is further provided with a gear-wheel H, which is designed to mesh with a similar gear I, secured to a short shaft J, which latter is journaled and free to turn or rotate in suitable brackets K, secured to the frame G.

Upon the outer end of the shaft J is a large grooved sheave L, about which the cable M passes, the said cable also passing about two similar sheaves N and O, arranged close to the sheave L on the extension A' of the carriage and carried by shafts P and Q. The shaft P is quite short, but the shaft Q is longer and carries at its inner end a bevel friction-wheel R, with which a larger bevel friction-wheel S, mounted upon the set-shaft C, is designed to engage. This wheel S, while free to slide along the shaft into and out of engagement with the wheel R, turns or rotates with the set-shaft, the movement of the wheel longitudinally of the shaft being effected by means of a hand-lever T and a bar U, pivoted to the hand-lever and to the carriage and engaging the hub of the wheel, two slightly-different arrangements being shown in Figs. 4 and 5. The cable M, which passes over the sheave L and under the sheaves N O, passes over supporting-sheaves V V', which are set into the floor beyond the limit of travel of the carriage, and passes about an intermediate sheave m' and driving-drum n', both of which are located below the floor, as clearly shown in Fig. 1. Now after the saw has made a cut and the carriage has been receded it is desirable that the knees be set forward so as to advance the log toward the saw, and this is accomplished by throwing the worm E up into engagement with the worm-wheel D, so that the motion that is communicated to the shaft J through the cable M and sheave L may be transmitted from the shaft through the gears H I, shaft F, worm E, worm-wheel D to the set-shaft C, from which latter motion is transmitted to the knees through the gearing j' k', and screw g'.

In order to throw the worm up into engagement with the worm-wheel, we employ a lever W, which is attached to the end of a shaft X, journaled in an upright or standard Y on the carriage and also in the cover of the worm-wheel. On one end the shaft X is provided with a radial arm C', having a lug b to fit into an angular slot o' p' in a plate or cross-head q', connected to the pivoted frame G by means of rods r', the cross-head being also provided with an elongated slot s' to receive the projecting end of the shaft, as clearly shown in Figs. 7 and 8. These parts are so arranged that when the frame G is in its proper position and the worm is in engagement with the worm-wheel the lug b will be in the curved portion p' of the angular slot and the end of the shaft X at the lower end of the slot s', but when the frame G is swung down and the worm disconnected from the worm-wheel the lug b will be found to be in the straight portion o' of the angular slot, and the end of the shaft X at the upper end of slot s'. Now if the lever W be carried rearward in the direction of the arrow in Fig. 8 the lug b will raise the cross-head q', and when the latter has been raised far enough to allow the lug to pass into the curved portion p' of the angular slot the raising will cease and the worm will be found to be in engagement with the worm-wheel. A reverse movement of the lever will bring the lug b into line with the straight portion o', whereupon the weight of the frame G (counterbalanced by the weight t', as shown in Figs. 3 and 4) will cause the free end of the frame to drop, the cross-head sliding relatively to the lug and shaft which project into the slots.

In devices of this character it is necessary that the knees be set up or advanced a predetermined distance each time, and in order to disconnect the worm and worm-wheel so that the setting up may be stopped, we provide mechanism for automatically operating the lever and throwing the worm-gearing out of action, which mechanism is best shown in Figs. 5, 6, 7, and 9.

Secured to shaft C is a gear-wheel c, which engages a similar but larger wheel d, carried by an elongated sleeve or hub e of the index-wheel D', this wheel being journaled in upright bracket or standard Y, as shown in Fig. 9. The rim of the wheel is turned smooth to receive a ring E', which is provided with a series of fine gear-teeth f and also with a series of gradations g, which are shown in Figs. 2, 4, 5, and 9.

On its front face the wheel is provided with a series of perforations or holes h, corresponding to the gradations i, formed upon a ring j, which is also applied to the front face of the wheel, the said ring being retained in a fixed position by an adjustable rod k, (see Fig. 6,) so as to permit the wheel D' to turn relatively thereto. An arm F', hung loosely upon the shaft X between the wheel D' and lever W, is provided with a spring-pressed pin having a head l, which pin is designed to enter any one of the holes or perforations h in the wheel, and thereby lock the wheel and arm together. The head l of the pin projects outward into such position that when the wheel is turned in one direction it (the pin) will strike the lever W and rock the shaft X and disconnect the worm-gearing, as before described; but in order that the reverse movement of the wheel may not throw the lever back into such position as would result in the re-engagement of the worm-gearing the lever is hinged or pivoted to its hub m, (Figs 6 and 9,) so that when the head l of the pin strikes the lever the latter will be thrown outward and allow the pin to pass without rocking the shaft X. A spring n (shown in Figs. 6 and 9) holds the lever in its normal position relatively to its hub, and the lever is provided with a beveled lateral projection o to facilitate the passage of the head of the pin.

Secured upon the hub or sleeve e is a small gear-wheel p, which engages with a similar gear q, secured to one end of a short shaft r, journaled in the standard Y, the opposite end of the shaft being provided with a small pinion s to gear into the teeth f of the indicator-ring E', as shown in Fig. 6.

The fixed indicator-ring j is provided with a pointer t, which, as shown in Figs. 2, 4, 5, 6, and 9, is designed to work over and be used in connection with the gradations g on the ring E'. These gradations (usually in inches) correspond to the total length of movement or travel of the knees, so that the total distance the knee has been moved upon the head-blocks may be accurately determined. The gradations $i$ formed upon the fixed ring-plate $j$ are designed to show to the operator or "setter," as he is termed, the distance in inches the knee and log will move each time the setting mechanism is thrown into operation prior to the making of a cut. The gearing between the screws in the head-blocks and the wheel is so proportioned that any movement of the knee will be attended by a corresponding movement of the wheel D' and the arm connected thereto by the spring-pin.

Briefly stated, the operation of the mechanism is as follows, assuming that the knees have been drawn back as in Fig. 10 and a log placed upon the carriage: The lever T is thrown over into such position as to disengage the wheels R and S and the lever W raised up into the position indicated in Figs. 2, 3, 4, 6, 7, and 9, this movement of the lever throwing the worm E into engagement with the worm-wheel by means of the connections C', $q'$, $r'$, and G, as already described. As soon as this is done the set-shaft C will be set in motion and the knees will be carried forward by their screws $g'$, which latter receive their motion through the gearing $j'$ $k'$. It is of course to be understood that the shaft J and the sheave L carried thereby rotate continuously regardless of the engagement of the worm and worm-wheel, and it will also be seen that inasmuch as the gears H I are always in engagement the shaft F will also rotate continuously, the raising and lowering of the frame G being such a slight movement as not to affect the gears H I carried by said frame. The rotation of the set-shaft C imparts motion to the gears $c$ $d$, and through the hub $e$ to the wheel D'. Assuming that it is desired to have the knees advance with the log a distance of two inches, the pin carried by the arm F' (and which had previously been inserted into the hole or opening $h$ opposite the figure 2 on the fixed indicator-ring $j$) will, after the knees have moved the required distance, strike the lever W and throw it forward, as shown in Fig. 9, and of course as the lever and the shaft X to which it is connected are thus rocked or tipped the frame G will be lowered and the worm and worm-wheel thrown out of engagement, thereby stopping the rotation of the shaft C and all other parts receiving motion therefrom. When this has been effected, a cut made, and the carriage receded, (or before the carriage recedes where an offsetting-carriage is used,) the operator or setter places the pin of arm F' into the hole $h$, now opposite figure 2, and throws the worm up into engagement with the worm-wheel by means of the hand-lever W, thereby again setting the shaft C in motion and advancing the knees an additional two inches, when the disconnection just above described will take place by reason of the head $l$ of the pin striking the lever W. By this arrangement the mechanism for advancing the knees will be thrown out of action automatically when the knees have been advanced any predetermined distance. The arm F' may be so set as to automatically disconnect the operating mechanism after the knees have been moved any distance from one-sixteenth of an inch to four inches. During the rotation of the set-shaft, as described, the small shaft $r$ has through its gear-wheels $p$ and $q$ received motion and transmitted such motion from the small pinion $s$ to the indicator-band E', with the teeth $f$ of which the said pinion engages. The saw corresponds to zero on the band, and as the gearing is so proportioned that the movements of the knees will be indicated by the gradations $g$ on the band, the distance of the knees from the saw may be readily determined. For instance, if the knees are eighteen inches from the saw and be moved two inches, the number 16 on the band will come opposite the pointer $t$, and when the knees have moved an additional two inches the number 14 on the band will come opposite the pointer, thus enabling the operator or setter to see at a glance the total distance remaining between the knees and saw. When the log and knees have been advanced as far as desired, it is desirable to recede the knees, so that a new log may be placed upon the carriage, and this is accomplished in the following manner: The lever T is thrown into such position as to bring the wheel S into contact with the wheel R, and as the shaft Q (which is continually rotated by the cable M passing over its sheave O) rotates motion will be imparted to the said shaft, and from the latter through the gearing $j$ $k$ to the screws $g'$, thereby causing the screws to turn or rotate backward and recede the knees. During this backward rotation of the set-shaft C the gearing $c$ $d$ and $p$ $q$ will of course receive motion therefrom, and in order to permit this backward rotation the lever W should have been previously thrown forward, so as to disconnect the worm and worm-wheel. As the shaft C rotates and brings the knees back to their position for receiving the oncoming log the gearing $p$ $q$ $r$ $s$ will cause the band E' to turn or rotate backward until sufficient space for the log is obtained, the number opposite the pointer $t$ indicating the distance between the saw and the knees. Backward rotation of the gearing $c$ $d$ merely carries the wheel D' with its arm F' around a number of times, the head $l$ of the pin carried by the arm striking the beveled face $o$ of the lever and forcing it back in passing.

We do not of course wish to limit ourselves to the details of construction herein shown and described, for it is obvious that the construction and arrangement may be considerably varied without departing from the spirit of our invention. For instance, in Figs. 4 and 5 we have shown two different methods of hinging or pivoting the outer end of the frame G, and have also shown two ways of pivoting the hand-lever T, by which the friction-gearing R S is thrown into and out of engagement. The connection between the carriage and the fixed indicator-ring $j$ is made adjustable to compensate for different thicknesses of saws and other slight variations, and as the pointer $t$ is carried by this ring the correction of the ring will correct the reading of the scale-band E'. The cable M is independent of the means employed for causing the travel of the carriage and may receive motion from any suitable source of power.

We do not consider the extension A' an essential feature in the construction of the carriage, as the operative mechanism may, but not with so good results, be mounted upon the main body of the carriage, and thereby render the extension unnecessary.

A chain or other flexible connection may be substituted for the cable, which latter may be made of wire or rope.

Where we use the expression "setting mechanism," we mean to include thereby any devices which are adapted to advance or recede the knees or both advance and recede them.

Having thus described our invention, what we claim is—

1. In combination with a saw-mill carriage and the setting mechanism thereon, a cable or other wrapping connection for imparting motion to the setting mechanism and remaining in engagement with the latter throughout the travel of the carriage, and a power mechanism independent of the carriage for imparting a continuous motion in one direction to the cable.

2. In combination with a saw-mill carriage and its setting mechanism, a continuously-traveling cable or other wrapping connection passing about pulleys mounted upon the carriage and forming part of the setting mechanism and also about pulleys carried in fixed bearings in the frame of the mill, and means for imparting motion to the cable, substantially as shown and described.

3. In combination with a saw-mill carriage, mechanism for advancing and receding the knees, pulleys L and O, mounted upon the carriage and connected, respectively, with the advancing and receding mechanisms, pulleys mounted in the frame of the mill, a continuously-traveling cable M, passing about the pulleys, and devices, substantially such as shown and described, for throwing either the advancing or receding mechanism into action or both out of action, as desired.

4. In combination with a saw-mill carriage having knees and a set-shaft and connections between the knees and shaft, a worm-wheel D, secured to the shaft, a hinged or pivoted frame G, carrying a continuously-rotating worm E, and means for raising and lowering the frame.

5. In combination with a saw-mill carriage having knees and a set-shaft and connections between the knees and shaft, a worm-wheel D, secured to the shaft, a hinged or pivoted frame G, carrying a continuously-rotating worm E, a cross-head $q'$, provided with slots $o'$ $p'$ $s'$, a shaft X, provided with a lug $b$, and a hand-lever W, secured to the shaft.

6. In combination with a saw-mill carriage, its knees and set-shaft, a worm-wheel D, secured to the shaft, a counterbalanced frame G, provided with a continuously-rotating worm E, and means for raising and lowering the frame.

7. In combination with a saw-mill carriage and its set-shaft and knees, a wheel D', provided with a series of holes or openings $h$, an arm F', a pin adapted to lock the arm to the wheel, a fixed scale $j$, and gearing for imparting motion to the wheel D'.

8. In combination with a saw-mill carriage and its set-shaft and knees, a wheel D', provided with openings $h$, an arm F', provided with a pin, a fixed scale $j$, gearing for imparting motion to the set-shaft and from the set-shaft to the wheel D', a lever, as W, in the path of the pin, and intermediate connections between the lever and gearing for imparting motion to the set-shaft, all combined substantially as and for the purpose set forth.

9. In combination with a saw-mill carriage and its set-shaft and knees, a wheel D', provided with holes $h$, an arm F', provided with a pin, a fixed scale $j$, mounted upon the face of the wheel, an indicator-ring E', mounted upon the rim of the wheel, a pointer $t$, carried by scale $j$, gearing for imparting motion to the set-shaft and from the set-shaft to the wheel D' and ring E', and a lever arranged in the path of the pin and serving to connect and disconnect the set-shaft from its operating-gear.

10. In combination with a saw-mill carriage and its set-shaft and knees, mechanism for imparting motion to the shaft, a wheel D', geared to the shaft and provided with holes $h$, an arm F', provided with a pin, a cross-head $q'$, carrying a part of the mechanism, a shaft X, connected with the cross-head and provided with a hub $m$, and a lever W, pivoted to the hub in the path of the pin.

11. In combination with set-shaft C and gearing for imparting motion thereto, pinions $c$ $d$, wheel D', provided with hub $e$ and holes $h$ and mounted upon the shaft X, arm F, mounted loosely upon the shaft X, pinion $p$, secured to the hub $e$, shaft $r$, provided with pinions $q$ $s$, a band E', applied to wheel D', a lever W, mounted upon shaft X, and connections between the said shaft and the gearing that operates the set-shaft.

12. In combination with a saw-mill carriage and its set-shaft, a worm-wheel D, carried by the shaft, a hinged frame provided with a shaft F, having a worm E and pinion H, a shaft J, provided with a gear I and sheave L, and a cable M, passing over the sheave.

13. In combination with a saw-mill carriage and its set-shaft C, a shaft J, intermediate connections between the shafts C and J, a bevel-wheel S, secured to the shaft C, a shaft Q, provided with a bevel-gear to engage the wheel S, sheaves L and O, secured, respectively, to the shafts J and Q, a cable passing about the sheaves, and means, substantially as shown, for throwing either of the shafts J and Q into gear with the set-shaft.

14. In combination with a saw-mill carriage and its set-shaft, a shaft J, provided with a sheave L, intermediate connections between the shafts for rotating the shaft C in one direction, a shaft Q, provided with sheave O, intermediate connections between the shafts Q and C, whereby the direction of rotation of shaft C may be reversed, and a cable passing about the sheaves L O.

15. In combination with a saw-mill carriage and the setting mechanism thereon, sheaves N L O, also mounted upon the carriage, sheaves V V', fixed in position near the floor, sheaves $m$ $m'$, located below the floor, and a continuously-traveling cable M, passing about the sheaves.

16. In combination with a head-block, a knee $d'$, provided with a slot $h'$, a plate $i'$, passing through the slot, and a screw $g'$, engaging the knee and located below the plate.

In witness whereof we hereunto set our hands in the presence of two witnesses.

EDWIN REYNOLDS.
    ALTON J. SHAW.
    WILLIAM H. TROUT.

Witnesses:
 WM. W. ALLIS,
 B. G. LINGARDER.